United States Patent [19]

Petersson et al.

[11] Patent Number: 4,520,003
[45] Date of Patent: May 28, 1985

[54] METHOD OF MANUFACTURING SULPHUR-TRIOXIDE FOR THE PRODUCTION OF SULPHURIC ACID

[75] Inventors: Stig A. Petersson; Ulf C. Waara, both of Skelleftehamn, Sweden

[73] Assignee: Boliden Aktiebolag, Stockholm, Sweden

[21] Appl. No.: 418,085

[22] Filed: Sep. 14, 1982

Related U.S. Application Data

[63] Continuation of Ser. No. 270,012, Jun. 3, 1981, abandoned.

[30] Foreign Application Priority Data

Jun. 19, 1980 [SE] Sweden ............... 8004588

[51] Int. Cl.³ .................. C01B 17/98; C01B 17/74
[52] U.S. Cl. ................... 423/533; 423/522
[58] Field of Search .................. 423/522, 533

[56] References Cited

U.S. PATENT DOCUMENTS

| | | | |
|---|---|---|---|
| 723,596 | 3/1903 | Ferguson | 423/533 |
| 1,344,905 | 6/1920 | Laist et al. | 423/542 |
| 1,520,093 | 12/1924 | Shapleigh | 423/523 |
| 2,128,108 | 8/1938 | Tyrer et al. | 423/522 |
| 3,671,194 | 6/1972 | Roberts | 423/522 |
| 4,016,248 | 4/1977 | Vydra et al. | 423/533 |

FOREIGN PATENT DOCUMENTS

| | | | |
|---|---|---|---|
| 469958 | 12/1950 | Canada | 423/533 |
| 4745 | 10/1979 | European Pat. Off. | 423/533 |
| 953583 | 12/1949 | France | 423/533 |
| 22393 | 10/1972 | Japan . | |
| 103895 | 9/1976 | Japan . | |
| 382967 | of 0000 | Sweden . | |
| 637585 | 5/1950 | United Kingdom | 423/522 |

OTHER PUBLICATIONS

Cathala, J., Chemie-Ing Tech. 25, No. 6, pp. 285–291, Jun. 1953, Direct Production of Sulfuric Anhydride on an Industrial Scale (Translated).

*Primary Examiner*—Gary P. Straub
*Attorney, Agent, or Firm*—Stevens, Davis, Miller & Mosher

[57] ABSTRACT

A method for manufacturing sulphur-trioxide for the production of sulphuric acid from sulphur-dioxide containing gas, particularly furnace gas obtained from metallurgical processes by oxidation to sulphur trioxide in the presence of a catalyst and conversion of the sulphur trioxide to sulphuric acid. The sulphur dioxide is first separated from the gas preferably converted to liquid form and is then subsequent to being vaporized in a stoichiometric excess oxidized with oxygen.

6 Claims, 1 Drawing Figure

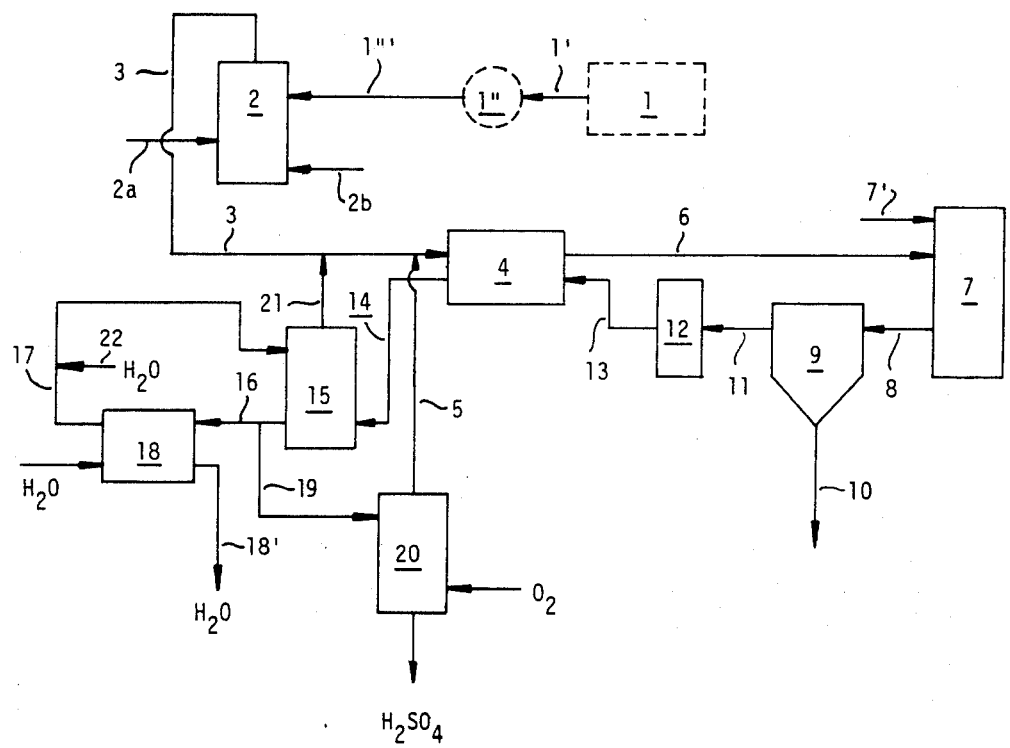

METHOD OF MANUFACTURING SULPHUR-TRIOXIDE FOR THE PRODUCTION OF SULPHURIC ACID

This is a continuation of application Ser. No. 270,012 filed June 3, 1981, now abandoned.

The present invention relates to a method of manufacturing sulphur-trioxide for the production of sulphuric acid from sulphur-dioxide containing gas, and particularly from furnace gas obtained with metallurgical processes. The method is even applicable for gases containing only a low sulphur-dioxide content, for example off-gases from power plants.

When manufacturing sulphur-trioxide for the production of sulphuric acid on an industrial scale, the starting material used is normally a process gas which contains sulphur dioxide. Such a process gas can be obtained by burning any material which contains sulphur. For example, when roasting sulphur-containing ore concentrates in metal producing processes, there is obtained a process gas which often contains from three to ten percent by volume sulphur dioxide.

It can also be mentioned that other process gases of interest in this connection are furnace gases obtained from discontinuous metallurgical processes, such as those gases obtained from converters in general and PS-converters and Kaldo-converters in particular, although furnace gases from continuous processes in the production of copper, lead and zinc are also of interest.

The sulphur-dioxide containing process gas is normally contaminated with metal dust, such as arsenic, mercury, cadmium etc., and must therefore be cleaned, by subjecting the same to various washing procedures before treating the gas in the sulphuric-acid manufacturing plant, which is generally a so-called contact plant for the catalytic oxidation of sulphur dioxide to sulphur trioxide. Such manufacture of sulphuric acid represents a substantial percentage allowance to cover the fixed costs of producing the main product, which is often a metal, although in many cases the manufacture of sulphuric acid is primarily motivated by the desire to purify process gases from sulphur. Another method of purifying process gas from sulphur is to absorb the sulphur-dioxide content in water or some other absorption liquid, which is thereafter de-gasified and, after being cleaned, is compressed in a de-gasified state to form liquid sulphur dioxide, as is taught, for example, in Swedish application No., B,382967 (7313965-1). This liquid sulphur dioxide is also a product which can be retailed and which provides a percentage coverage to the costs of the main product.

Thus, the majority of metal producers using sulphur-containing crudemetal starting materials are more or less forced to account for the sulphur content of the process gases produced, and are often able to manufacture sulphuric acid and/or sulphur dioxide in separate production lines.

Consequently, those requirements demanded in the manufacture of sulphuric acid lie very heavy when establishing modern metallurgical processes for the production of metals from sulphidic raw materials. Consequently, exhaustive restrictions are placed on the manner in which the metallurgical processes are carried out with respect to gas flow, discontinuity etc..

One problem encountered when manufacturing sulphur-trioxide for the production of sulphuric acid from sulphur dioxide containing process gases is that the oxidation of sulphur dioxide to sulphur trioxide takes place very slowly, and hence technically advanced contacts (catalysts) must be added. These contacts must operate at constant operation conditions with regard to gas load, sulphur dioxide content and temperature. Since normally the sulphur-dioxide content of the input gas may not be higher then 7–8 percent, the gas volyme is high, meaning that the sulphuric-acid manufacturing plant must also have large dimensions, resulting in high investment costs and operating costs. A further serious problem, and one which is an expensive disadvantage, is that the prices of sulphuric acid and sulphur dioxide fluctuate greatly, mainly due to supply and demand. The result of this last-mentioned disadvantage is that metal producers, in order to keep production going, are often forced to sell solely sulphuric acid or sulphur-dioxide at prices which lie far beneath the normal costs, or at least far beneath the costs of manufacture.

There are processes known by which sulphur trioxide is produced by a reaction between technical pure sulphur dioxide and pure oxygen. However, none of the processes hitherto suggested has proven to be satisfactory due to different severe problems occurring when operating the same. Thus, it has not been able to find any catalyst to be used under any longer time periods. Conventional catalysts for sulphur trioxide conversion are laying wasted and thus unactivated already after a short time of use. One of the reasons is that it has been found extremely difficult to control the reaction temperature and rapid temperature increases mean an immediate destruction of the catalyst. All these problems are also thoroughly disclosed and penetrated in some of the prior art publications hereinafter discussed.

In Swedish Application No., C,69829 it was Already in 1925, in order to overcome difficulties of the above mentioned type, suggested to continuously change the composition of the gas mixture supplied to the contact bed. During the operation the produced amount of sulphur trioxide was suggested to be kept constant by a continuous controlling of the ingoing gas mixture composition in order to overcome the problems with the decreasing contact activity. Furthermore it was suggested to dilute the gas mixture with inert gas to better control the heat evolved in the catalyst bed. The last mentioned inert gas supply seems very essential for the operation and therefore this process is of mere theorethic interest and it has never come into practice as far as we are aware.

Other processes suggested for conversion of pure sulphur dioxide to sulphur trioxide are disclosed in Federal Republic of Germany Application No., A, 2 159 789 and 2 223 131, both of which contemplate a recirculation procedure of part of the produced trioxide in order to control the reaction temperature in the contact bed. Notwithstanding the recirculation it was found impossible to convert gases having a sulphur dioxide content exceeding about 9 percent by volume without destroying the catalyst. Consequently, there was a need for inert gas supply for diluting the ingoing gas mixture and thereby the apparatus dimensions must be large and the produced gas is depleted with regard to sulphur trioxide due to the inert gas supply. An improved method was suggested in Federal Republic of Germany Application No., A, 2 418 216, by which method the conversion reaction is carried out in liquid-cooled tube heat-exchangers using a $SO_2/O_2$-mixture which may be stoichiometric or may contain excess oxygen, whereby the example contemplates a stoichiometric gas mixture. In spite of the specific and rather complicated apparatus facilities needed for controlling the reaction temperature a catalyst having a comparatively low content of vanadium pentoxide must be used to overcome process problems otherwise occurring. Thus, it is claimed advantageous to use only 0.5–1% by weight of $V_2O_5$ in the catalyst bed, which implies comparably high contents of catalyst mass and large reactor volumes to be used compared with conventionally used catalysts normally containing 4–6% by weight of $V_2O_5$.

Another process in this art said to overcome the above mentioned temperature problems is disclosed in Norwegian Application No., B, 131417 corresponding to U.S. Pat. No. 3,671,144 filed May 1, 1970 whereby it uses a multi-stage technique for the conversion. The gas treated contains 25–100% by volume of sulphur dioxide and is first mixed with a stoichiometric excess of oxygen and then contacted with the catalyst in a reaction zone and subsequently cooled. In the succeeding stages the reaction gas from a preceding stage is mixed with a new portion of the starting gas in specified proportions to avoid a temperature raise being too high to be permitted in the next conversion stage.

In the working examples there are contemplated seven consecutive conversion stages, in which conversion is carried out with an excess of oxygen in all but the very last stages. E.g. in the first stage the $SO_2/O_2$ ratio is about 2:4.5, the stoichiometric ratio being 2:1.

In Federal Republic of Germany Application No., 2 307 973 a method of converting $SO_2$ to $SO_3$ is disclosed whereby the method using a multistep technique and excess oxygen supply can utilize $SO_2$-gas having an $SO_2$ content of up to 66% by volume.

The object of the present invention is to substantially eliminate all of the aforementioned disadvantages while providing certain advantages, for example of environmental point of view, such as less emission problems than when using conventional sulphuric acid processes. Thus, when practising the method according to the invention the reaction between sulphur dioxide and oxygen to form sulphur trioxide is promoted, and the dimensions of the apparatus for each ton of sulphuric acid produced are considerably smaller compared to conventional processes. The production of concentrated sulphur dioxide gas or liquid sulphur dioxide, which is prerequisite of the invention, can, in combination therewith, provide practically unlimited flexibility with regard to the choice of sulphur dioxide or sulphuric acid as the end product.

The characterizing features of the present invention are set forth in the following claims. Thus, in the method invention there is used a stoichiometric excess of sulphur dioxide, in the form of a concentrated gas, which may be originating from liquid sulphur dioxide, and which is added in a manner such as to enable the reaction temperature to be accurately controlled. The sulphur dioxide is oxidized with a gas containing oxygen and preferably with pure oxygen, and hence the oxidation reactor vessel may be constructed in a simple manner, with only one or two catalyst beds. Thus it is possible to use a gas containing inert gases, it is not preferred to, since the inert gases then must be removed by bleeding. The bleeded gases containing inert gases may be utilized and the sulphur dioxide recovered by leading the gases to the sulphur dioxide separation step, for example a sulphur dioxide plant. Consequently, it is not so important to use extremely high oxygen grades, as the process provides possibilities to take care of any inert gases supplied with the oxygen. The heat generated during the reaction can be effectively recovered in the form of high-pressure vapour. By accurately controlling the sulphur dioxide oxygen ratio the process provides the reactions to be carried out without heating the reactants and with least possible cooling need in the reactor. While the process may be carried out using $SO_2/O_2$ ratios down to about 2.5, it is thus preferred to use $SO_2/O_2$ ratios of about 9 to 11, when using single catalyst bed, whereas ratios of about 5 to 7 may be used for a multi-bed process. These preferred ratios permit the process even to be carried out adiabatically.

It also lies within the scope of the invention to introduce liquid sulphur dioxide directly to the catalyst bed, thereby enabling the temperature of the catalyst bed to be quickly lowered and to maintain the bed at a low temperature and within the temperature range desired.

By "pure oxygen" is meant here and in the following substantially technical and commersially available oxygen grades. Thus, it lies within the scope of the invention for "the oxygen" to contain certain minor quantities of other gases.

Sulphur dioxide can be separated from process gases in a number of ways, although preferably it is separated from the gas by absorption in water or some other absorption agent, whereafter it is driven-off by adding vapour and compressed to liquid sulphur dioxide. By separating the sulphur dioxide from the process gas in this way, and by storing the same, provision is made for obtaining a very uniform supply of sulphur dioxide for the manufacture of sulphuric acid. A further advantage afforded by the method according to the invention is that an extremely pure sulphuric acid can be produced. This, among other things, is of great interest with response to sulphuric acid which is to be used as a raw material for the manufacture of fertilizers, where even trace quantities of certain impurities may be undesirable.

The method is based on the following exothermic reaction which is known to the art and which has been thoroughly penetrated

and hydration according to

Reaction (1) is favoured thermodynamically by low temperature and high pressure. The reaction kinetics, however, are disfavoured by low temperature which is compensated by using a catalyst. In order to achieve acceptable reaction rates, the reaction is normally carried out at temperatures between 400° and 650° C. In this respect, it may prove problematic to control the temperature of the exothermic reaction.

By producing sulphur trioxide from purely oxygen and excessive quantities of sulphur dioxide and by recirculating the residual sulphur dioxide, as with the method according to the present invention, the reaction equilibrium (1) moves towards the right and the reaction thereby is promoted.

An exemplary embodiment of the invention will now be described in more detail with reference to the accompanying drawing, the single FIGURE of which is a block schematic illustrating said preferred embodiment.

As indicated at 1 in the FIGURE, liquid sulphur dioxide is produced from sulphur dioxide containing process gases by absorption and degasification in accordance with a method described in SE,B, No. 7313965-1 and is passed, via line 1', to a storage tank 1" for liquid sulphurdioxide, from which sulphur dioxide can be removed in desired quantities and passed via line 1''', to a sulphur-dioxide vaporizer 2. Vaporization of the sulphur dioxide is effected by adding steam or hot water to the vaporizer 2 via a line 2a. After giving off heat the steam or hot water is removed from the vaporizer through a line 2b. In the illustrated case it is necessary to supply a quantity of heat corresponding to 0.1 tons of steam for each ton of sulphuric acid produced. Part of the sulphur dioxide is suitably added in liquid form, directly to the contact tower, so that the temperature can be controlled.

The sulphur-dioxide gas formed, which has a temperature of about 25° C., is passed to a heat exchanger 4, via a line 3, and is preheated with oxygen charged to the exchanger 4 via a line 5, in a quantity corresponding to a stoichiometric sulphur-dioxide excess of approximately 5:1, and to a temperature of about 400° C. The thus preheated gaseous mixture is passed, via a line 6, to a contact tower 7, in which the sulphur dioxide is oxidized to sulphur trioxide with the aid of the oxygen and a catalyst, suitably vanadium pentoxide. In those cases where it is necessary to strongly cool the catalyst, liquid sulphur dioxide is introduced directly to the contact tower 7 as indicated by the arrow 7'. Alternatively there may however be used cooling means in the bed for indirect cooling.

As a result of the exothermic reaction in the contact tower 7, the gaseous mixture comprising sulphur dioxide and sulphur trioxide and departing from the tower through a line 8 has a temperature of about 650° C. As indicated by the arrow 10, part of the heat content of this gas is taken out in the form of high pressure vapour during passage of the gas through a boiler 9. The gas, which now has a temperature of about 400° C., is optionally passed, via lines 11, 13 through a further contact 12 prior to being passed back through the heat exchanger 4, for heating incoming gas. The gas is passed, via a line 14, at a temperature of about 50° C. into an absorption tower 15, to react with sulphuric-acid solution circulating through the tower via lines 16, 17, water also being added to the sulphuric-acid solution, as indicated by the arrow 22, in an amount corresponding to the amount of sulphur trioxide. The gas which is not absorbed in the absorption tower 15 is recirculated to the heat exchanger 4, via a line 21. Before the hot sulphuric acid leaving the absorption tower 15, with sulphur dioxide in solution, is passed to a heat exchanger 18, via a line 16, for cooling with water there is taken from said flow a part flow which is passed to a stripping tower 20 via a line 19. In this way there is produced in the heat exchanger 18 hot water having an energy content corresponding to about 0.4 tons of steam per ton of sulphuric acid produced, which is taken out as illustrated by the arrow 18'. Sulphur dioxide is driven from the sulphuric acid, which is passed to the stripping tower 20, via the line 19, with the aid of oxygen supplied thereto, whereat the sulphur dioxide stripped off and the oxygen are supplied to the heat exchanger 4 via the line 5. The sulphuric acid freed from sulphur dioxide is removed from the stripping tower 20 as an end product, as indicated.

EXAMPLE 1

A number of tests were carried out to investigate the performance of the catalysts when used for oxidizing a pure sulphur dioxide gas with pure oxygen to sulphur trioxide. The gas rates were controlled by a flow meter for each component, whereupon the gases were mixed before heating. Then the preheated gas mixture was introduced to a 300–400 mm high catalyst bed of a catalyst mass having the trade-name BASF 04-10 in the form of 6 mm rods weighing 100–150 g in total and containing 6% by weight of $V_2O_5$. The temperature of the bed was monitored continuously. The inlet and outlet temperature at stable operation conditions are set forth in the table below together with other data obtained in the tests.

TABLE

| Test No | $SO_2$ % | $O_2$ % | $SO_2/O_2$ ratio | Time of operation h | Inlet temp °C. | Outlet temp °C. |
|---|---|---|---|---|---|---|
| 1 | 94 | 6 | 16 | 10 | 450 | 580 |
| 2 | 93 | 7 | 13 | 10 | 450 | 610 |
| 3 | 92 | 8 | 11 | 40 | 430 | 640 |
| 4 | 90 | 10 | 9 | 30 | 430 | 660 |
| 5 | 85 | 15 | 6 | 0.2 | 430 | (x) |

(x) catalyst destroyed

In all tests, except No 5, there was a nearly 100% yield of oxygen. As can be seen from the temperature tests No 3 and 4 are the best. In tests No 1 and 2 the gas mixture had to be preheated to a higher temperature to obtain a stable oxidation. In test No 5, in which the $SO_2/O_2$ ratio is so low as 6, the catalyst was destroyed due to a large temperature increase, but this problem could have been solved if in accordance with the invention part of the sulphur dioxide introduced had been in the liquid state and thus had cooled the bed.

Other catalysts, such as Degussa 1% Pt on silicone and Haldor-Topsöe VK 38 A, 4×7 mm rings, 7% $V_2O_5$, were also tested with similar positive results.

EXAMPLE 2

In a plant of the kind illustrated in the FIGURE, having a capacity of 10 tons of $H_2SO_4$ per hour, about 6.5 tons liquid sulphur dioxide were vaporized each hour by adding about one ton of low-pressure steam per hour. Oxygen in an amount of 1.6 tons per hour was added to the sulphur dioxide and, subsequent to being preheated, the gaseous mixture was passed to the contact tower, in which sulphur trioxide was formed. Additional supply of sulphur dioxide to the contact tower is provided by recirculation of the gas passing the absorption tower. The heat developed during the process was recovered partly in the orm of vapour, 0.4 tons of vapour (40 atm) per ton of $H_2SO_4$, and partly by preheating incoming gaseous mixtures. The sulphur trioxide formed was absorbed in sulphuric acid and heated by released absorption heat. Of the sulphuric acid in which sulphur trioxide had been absorbed, ten tons were removed each hour, while a part flow was cooled with water, in a heat exchanger and diluted so that it could again absorb sulphur trioxide. In this way, the heat exchanger produces hot water in a quantity corresponding approximately to 0.4 tons of steam (40 atm) per ton of $H_2SO_4$, at a temperature of approximately 85° C.

We claim:

1. In a contact method under about atmospheric pressure for the manufacture of sulphur trioxide for the production of sulphuric acid from sulphur-dioxide containing gas, particularly furnace gas obtained from metallurgical processes, by oxidation of sulphur dioxide to sulphur trioxide in the presence of a catalyst and recovering the sulphur trioxide, the improvement comprising separating the sulphur dioxide from the gas and oxidizing to sulphur trioxide with oxygen supplied to the sulphur dioxide in a stoichiometric deficiency in at least one catalyst bed, said deficiency being in a molar ratio $SO_2/O_2$ of at least 5.

2. A method according to claim 1, characterized in that the molar ratio $SO_2/O_2$ is about between 9 and 11 when employing a single catalyst bed.

3. A method according to claim 1 or 2, characterized in that nonoxidized sulphur dioxide is recirculated.

4. A method according to any of claims 1 or 2, characterized in that the sulphur dioxide is separated from the gas by utilizing a process for producing liquid sulphur dioxide.

5. A method according to claim 4, characterized in that at least part of the sulphur dioxide is supplied directly to the catalyst in a liquid condition.

6. A method according to claim 1, characterized in that the molar ratio $SO_2/O_2$ is about between 5–7 when employing multi-beds of catalyst.

* * * * *